(12) United States Patent
Hagelin

(10) Patent No.: US 7,188,069 B2
(45) Date of Patent: Mar. 6, 2007

(54) METHOD FOR VALUING INTELLECTUAL PROPERTY

(75) Inventor: Theodore Hagelin, Manlius, NY (US)

(73) Assignee: Syracuse University, Syracuse, NY (US)

( * ) Notice: Subject to any disclaimer, the term of this patent is extended or adjusted under 35 U.S.C. 154(b) by 826 days.

(21) Appl. No.: 09/726,277

(22) Filed: Nov. 30, 2000

(65) Prior Publication Data

US 2002/0077835 A1 Jun. 20, 2002

(51) Int. Cl.
*G06Q 99/00* (2006.01)
(52) U.S. Cl. ....................... 705/1; 7/8; 7/400
(58) Field of Classification Search ................. 705/1, 705/6, 7–8, 10, 33, 35–38, 400
See application file for complete search history.

(56) References Cited

U.S. PATENT DOCUMENTS 4,334,270 A 6/1982 Towers (Continued)

FOREIGN PATENT DOCUMENTS

CA 2201429 A * 10/1998

(Continued)

OTHER PUBLICATIONS

Mard et al., "Intellectual Property Valuation", Apr. 2000, 20 pages, available at www.fvginternational.com.*

(Continued)

*Primary Examiner*—John W. Hayes
*Assistant Examiner*—Freda A Nelson
(74) *Attorney, Agent, or Firm*—George R. McGuire; Bond, Schoeneck & King, PLLC

(57) ABSTRACT

A method of placing a discrete value on an intellectual property asset through a series of associations and calculations that determine the proportional contribution of an intellectual property asset to the competitive advantage of a related product in a real market. The methodology of the present invention first associates the intellectual property asset with a related tangible asset that embodies the intellectual property asset. After a set of parameters that define the tangible asset are identified, the tangible asset is quantitatively compared to competing tangible assets in the marketplace to determine its overall competitive advantage relative to those competing assets. The contribution of the intellectual property asset to the average competitive advantage of the tangible asset in which it is embodied is calculated by first comparing the intellectual property asset to substitute intellectual property assets that are embodied in competing tangible assets and associated with the same parameter. Next, the intellectual property asset is compared to complementary intellectual property assets that are included in the same tangible asset and associated with the same parameter group. Based upon the proportional competitive advantage contribution of the intellectual property asset to the average competitive advantage of the tangible asset, a percentage of the tangible asset's present value is assigned to the intellectual property asset. The present invention can also be used for planning development of pre-market products, calculating the value of a license to a licensor and licensee, and selecting among alternative research and development investments.

13 Claims, 12 Drawing Sheets

U.S. PATENT DOCUMENTS

| | | | |
|---|---|---|---|
| 5,526,257 A | 6/1996 | Lerner | |
| 5,970,479 A | 10/1999 | Shepherd | |
| 5,999,907 A | 12/1999 | Donner | |
| 6,018,714 A | 1/2000 | Risen, Jr. et al. | |
| 6,038,554 A | 3/2000 | Vig | |
| 6,321,205 B1 * | 11/2001 | Eder | 705/7 |
| 6,330,547 B1 * | 12/2001 | Martin | 705/38 |
| 6,556,992 B1 * | 4/2003 | Barney et al. | 707/6 |
| 6,615,195 B1 * | 9/2003 | Chittipeddi | 705/400 |
| 2001/0034695 A1 * | 10/2001 | Wilkinson | 705/37 |
| 2002/0046038 A1 * | 4/2002 | Prokoski | 705/1 |
| 2003/0061064 A1 * | 3/2003 | Elliott | 705/1 |

FOREIGN PATENT DOCUMENTS

| | | |
|---|---|---|
| CA | 2201429 A1 * | 10/1998 |
| WO | WO 01/93154 A2 * | 12/2001 |

OTHER PUBLICATIONS

Bertolotti, Nick, "Valuing Intellectual Property", Feb. 1995, Managing Intellectual Property, Iss. 46, p. 28, 7 pgs, 1988, International Journal of Technology Management, vol. 3, Iss 1-2, p. 31 (abstract 2 pgs).*

Neil, D. J. , "The Valuation of Intellectual Property", 1988, International Journal of Technology Management, vol. 3, Iss 1-2, p. 31 (abstract).*

Hulsey III, William N. , "Intellectual property valuation aids in high tech investments", Dec. 19, 1997, Austin Business Journal, vol. 17, Issue: 42, p. 31.*

Hyden et al., "Identifying, protecting and valuing intellectual property", Jul./Aug. 1998, Journal of Asset Protection, vol. 3, Iss. 6. (2 pg abstract).*

Bertolotti et al., The valuation of intellectual property, Nov. 26-27, 1996, Beijing, WIPO National Seminar On the Valuation of Industrial Property Assets.*

Parr, Russell, "Pricing Intangible Assets: Methods of valuation of intellectual property", Nov. 19-20, 1998, Lima, Seminario Sombre Valorizacion de la propiendad intelectual.*

Turner, John, "Valuation of Intellectual Property Assets; valuation techniques: Parameters, methodologoes and limitations", Nov. 22-24, 2000, Taejon, Republic of Korea., WIPO Asian regional forum on the intellectual property trategy for the promotion of innovative and inventive activities.*

Austin, David. H, "An Event-Study Approach to Measuring Innovative Output: The Case of Biotechnology", May 1993, The American Economic review, vol. 83, No. 2. pp. 253-258.*

* cited by examiner

METHOD FOR VALUING INTELLECTUAL PROPERTY

BACKGROUND OF THE INVENTION

1. Field of the Invention

The present invention relates to methods for determining the value of an intellectual property asset, and more particularly to valuation methods which rely upon the competitive advantage offered by the asset as their foundation.

2. Description of Prior Art

Intellectual property assets have become an increasingly important source of corporate wealth. Estimates of the fraction of total market capitalization in the U.S. comprising intellectual property assets range from fifty percent to over ninety percent, representing trillions of dollars of corporate assets. Valuation is a core task in the management of all assets. Management competency, however, has lagged behind the growing importance of intellectual property assets. Estimates of the underutilization of intellectual property assets in the U.S. range from $100 billion to nearly $1 trillion. There are many reasons for the gap between management competency and the growing importance of intellectual property assets to corporate value. One of the most important of these reasons is the lack of adequate methods for the valuation of intellectual property assets.

Marketing, finance, sales and many other management functions depend upon a knowledge of an asset's value. There are a number of well developed and widely accepted methods available for valuing tangible assets. There is no such method available for valuing intangible assets. The lack of adequate valuation methods for intellectual property assets impedes their development, use and exchange.

The proper valuation of intellectual property assets is a multi-billion dollar challenge in today's economy. Intellectual property assets should be managed to maximize shareholder value in the same way as tangible assets such as land, buildings, and equipment. Intellectual property assets also need to be valued in the same way as land, buildings, and equipment in order to be properly managed. Unfortunately, the valuation methods which have been developed for tangible property cannot be used with intellectual property because of the lack of established markets for intellectual property assets.

The "market method" is the most reliable measure of tangible property value when it can be used. The market method determines the value of a given tangible asset by the price paid for comparable assets. Use of the market method is dependent on four critical conditions: there must be an active market for substantially similar assets; the transactions must be substantially similar; the parties must deal at arm's length with one another; and the prices and terms of the transactions must be available to the public in some form. Unfortunately, the conditions required by the market method do not exist in the context of intellectual property. Intellectual property assets are required by law to be dissimilar; patents must be novel and non-obvious compared to prior art and copyrights must be original works. Although exchanges of patents, copyrights and trade secrets occur every day in every industry, these exchanges do not take place through established markets, but are sporadic and specialized. Intellectual property exchanges are generally motivated by strategic advantage, not by trading opportunities, and are unique to the firms involved. There is a wide variety of terms and conditions by which intellectual property can be transferred. Licensing professionals craft agreements to suit the special needs of their clients and rarely are two agreements identical. The greatest disadvantage in using the market method to value intellectual property, however, is the lack of publicly available information on the terms and conditions of exchanges.

A number of different methods have been proposed specifically for the valuation of intangible property. Nevertheless, each of these methods has disadvantages. One "rule of thumb" method is commonly known as the "25% rule." The 25% rule sets the licensor's royalties at 25% of the licensee's net profits derived from the license. The disadvantage of the 25% rule is that one rule cannot value all intellectual property, for all parties, in all situations. An even more simple rule of thumb is the "$50,000 rule." The $50,000 rule states that the average patent in the average patent portfolio has a value of $50,000. The disadvantage of the $50,000 rule is that one value cannot be attributed to all patents, in all portfolios, at all times.

Another method proposed for valuation of intangible assets is the "top-down" method. The top-down method begins by calculating the market value of a firm, either from the price of its outstanding common stock, in the case of a public company, or from substitute measures such as price-earnings ratios or net cash flows, in the case of a private company. The total value of the firm's tangible assets, including land, buildings, equipment and working capital, is then subtracted from the market value of the firm and the remainder is the total value of the firm's intangible assets. The primary disadvantage of the top-down method is that it cannot be used to value individual or distinct groups of intellectual property assets. The top-down method also does not provide a means for differentiating among different types of intangible assets, or apportioning market value among distinct sets of intangible assets.

A variation of the top-down method is the known as the "tech factor method." The tech factor method associates core patents with different business divisions of the firm, and then allocates the business divisions' total net present value among the core patents based on an industry specific standard percentage. One disadvantage of the tech factor method is that it does not account for the effect of intangible assets other than patents on a business division's total net present value. Another disadvantage is that the method cannot value individual patents, or groups of patents, differently. All patents associated with the same business division will have the same value.

Another approach to valuing intangible property is the "knowledge capital scorecard." The knowledge capital scorecard first subtracts from a firm's annual normalized earnings the earnings from tangible and financial assets. The remainder of the earnings, which are generated by "knowledge assets," is divided by a knowledge capital discount rate to calculate the value of intellectual property assets. One disadvantage of the knowledge capital scorecard is that it does not separate the different types of "knowledge assets." Another disadvantage is that the method cannot value individual knowledge assets, or groups of knowledge assets, differently.

The most recent methods which have been proposed for valuation of intangible assets use mathematical or economic models. The "Monte Carlo analysis" attempts to value intangible assets based on a probability weighted distribution of alternative possible values. "Black-Scholes option analysis" attempts to value intangible assets based on the value of future strategic options which a firm possesses as a result of owning the intangible asset. The disadvantages of these methods are that they are very complex, require substantial technical and computing resources, and depend on large amounts of detailed data.

Finally, the Technology Risk Reward Unit (TRRU) valuation method is a modification of Black-Scholes option pricing model. The TRRU method combines data on the cost of completing technology development, the time required to bring the technology to market, the date of patent expiration, the marketplace value of the technology, the variability of the value estimate, and a risk-free interest rate to determine a suggested value for an intellectual property asset. The TRRU method depends upon an Intangible Asset Market Index (IAM) to calculate the marketplace value of a technology and the variability of a value estimate. The IAM tracks broad industry segments, such as health care and automobiles, and specific technologies within each segment, such as imaging equipment and automotive glass, to measure the average value of comparable technology. The disadvantage of the TRRU method is that it does not account for different types of intellectual property assets and does not differentiate between intellectual property assets representing minor and major advances in a field.

3. Objects and Advantages

It is therefore a principal object and advantage of the present invention to provide a methodology that can be used to distinguish among different types of intellectual property, to value individual or sets of related intellectual property assets, and to value intellectual property assets consisting of minor and major advances in a field differently.

A further object and advantage of the present invention is to provide a methodology that can be implemented with a minimum amount of information generally available to the public and that can also be implemented with information generated through proprietary research and analysis thus allowing the user to decide the line between cost and relative accuracy of the valuation on a case-by-case basis.

An additional object and advantage of the present invention is to provide a methodology that can be used for planning development of pre-market products, negotiating licensing transactions, and selecting among research and development investments.

With regard to planning the development of pre-market products, the invention has the object and advantage of being able to value different product configurations to determine which provides the greatest return on total investment.

With regard negotiating licensing transactions, the invention has the object and advantage of being able to calculate the value of a license to a licensor and licensee, and of calculating a license payment which provides a licensor and licensee an equal return on their respective investments in the license.

With regard to selecting among research and development investments, the invention has the object and advantage of calculating the return on investment in the creation of new intellectual property assets incorporated in existing or new products.

Other objects and advantages of the present invention will in part be obvious, and in part appear hereinafter.

BRIEF SUMMARY OF THE INVENTION

In accordance with the foregoing objects and advantages, the competitive advantage valuation method of this invention comprises a series of modular associations and calculations that ultimately determine the value of an intellectual property asset. By calculating the proportional contribution of an intellectual property asset to the competitive advantage of a related product in a real market, a discrete value can be placed on the intellectual property asset.

The fundamental premise of the present invention is that the value of an intellectual property asset can be calculated from the competitive advantage that it contributes to a discrete tangible asset that competes in a marketplace. The methodology of the present invention first associates the intellectual property asset with a related tangible asset that embodies the intellectual property asset. After a set of parameters that define the tangible asset are identified, the tangible asset is quantitatively compared to competing assets in the marketplace to determine its overall competitive advantage over those competing assets. The competitive advantage of the intellectual property asset relative to the total competitive advantage of the tangible asset is calculated based upon a quantitative comparison to the other intellectual property assets that are embodied in competing assets and the tangible asset. Based upon the relative competitive advantage contribution of the intellectual property asset to the overall competitive advantage of the tangible asset, a percentage of the overall value of the tangible asset is assigned to the intellectual property asset.

A determination of the competitive advantage that an intellectual property asset can contribute to a tangible asset in the market place can be used to calculate more than just the value of that asset. The methodology may also be used to predict the market share that a product embodying a specific set of intellectual property assets will eventually achieve once introduced into the marketplace. The competitive advantage methodology also forms the basis for calculation of the value of a license of an intellectual property asset to both the licensor and the licensee or licensees. The calculation of competitive advantage is also integral to valuing a new intellectual property asset that is an improvement over or replacement of an existing intellectual property asset.

DETAILED DESCRIPTION OF THE INVENTION

The method of this invention comprises a series of associations and calculations that determine the value of an intellectual property asset. Specifically, this invention determines the value of an intellectual property asset as a function of the competitive advantage which it contributes to a tangible asset. Tangible assets (i.e. products, processes, and systems) are viewed as an aggregation of intangible intellectual property assets (i.e. patents, trade secrets, copyrights, trademarks, and business methods). Thus, an intellectual property asset is synonymous for an intangible asset and a tangible asset refers to a concrete product, process, or system. For convenience, the description will often refer to a product as an example of a tangible asset. As many of the associations and calculations are independent or form a basis for later calculations, they do not necessarily need to be performed in any particular order unless noted.

Figure 1:
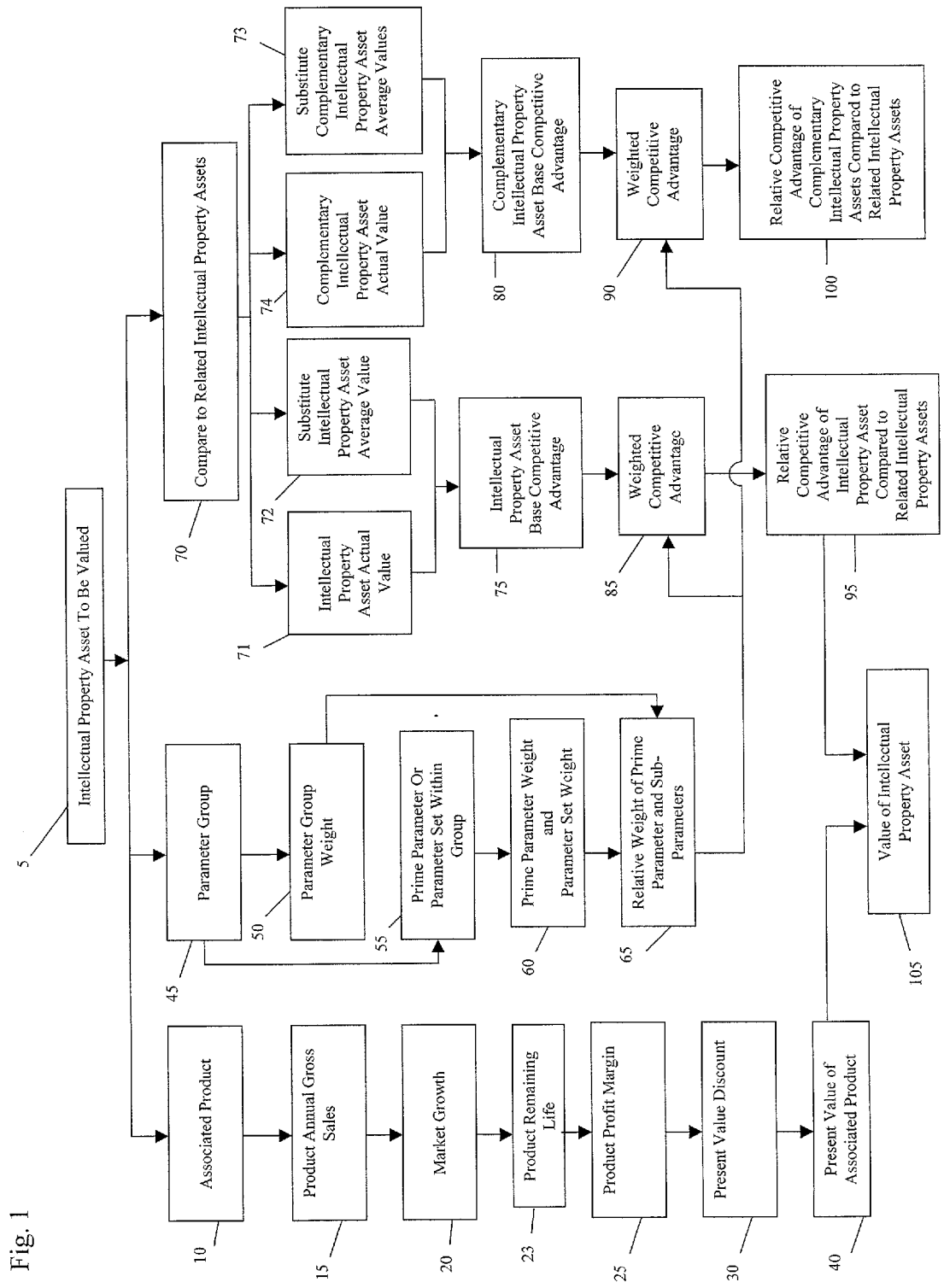
FIG. 1 is a detailed flow chart of a first embodiment of the present invention.
Figure 2:
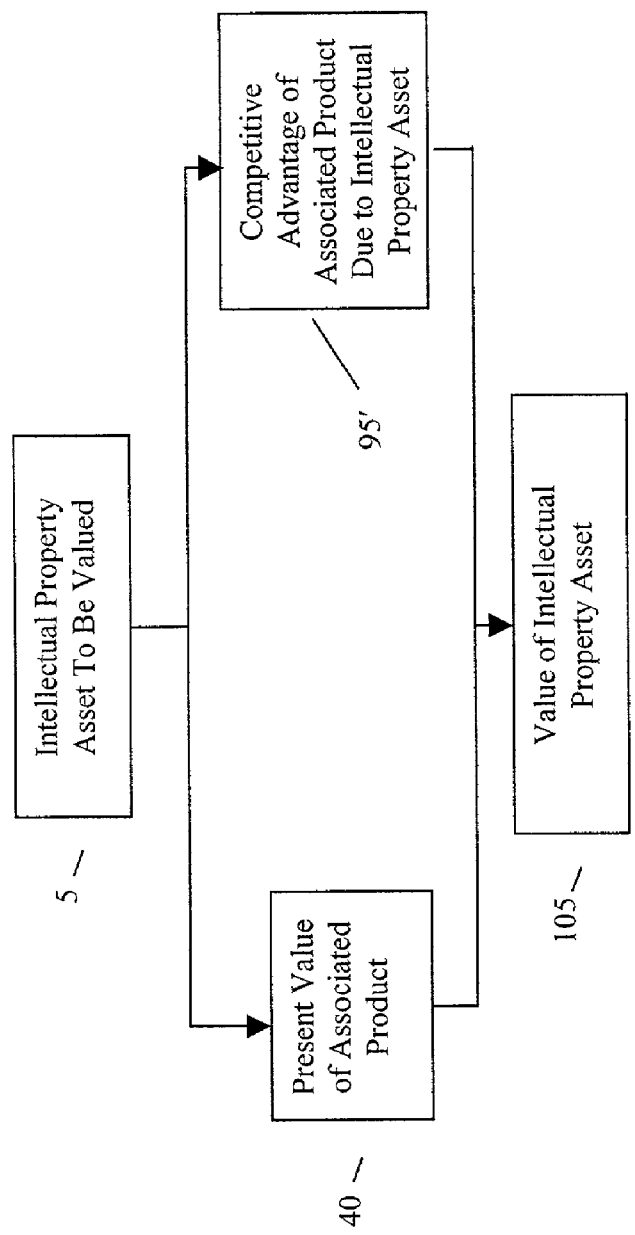
FIG. 2 is a high level flow chart of a first embodiment of the present invention.

Referring now to the drawing Figures, wherein like reference numerals refer to like parts throughout, there is seen in FIG. 1 an illustration of the detailed methodology with all requisite steps required for calculating the value of an intellectual property asset (IPA) 5. FIG. 2 illustrates that the basis of the methodology for calculating the value of an intellectual property asset 5 involves the combination of the present value of an associated product 40 (i.e. a tangible asset incorporating the intellectual property asset) and the competitive advantage of the associated product due to the intellectual property asset 95'. From these modules, a value of the intellectual property asset 105 can be determined.

Figure 3:
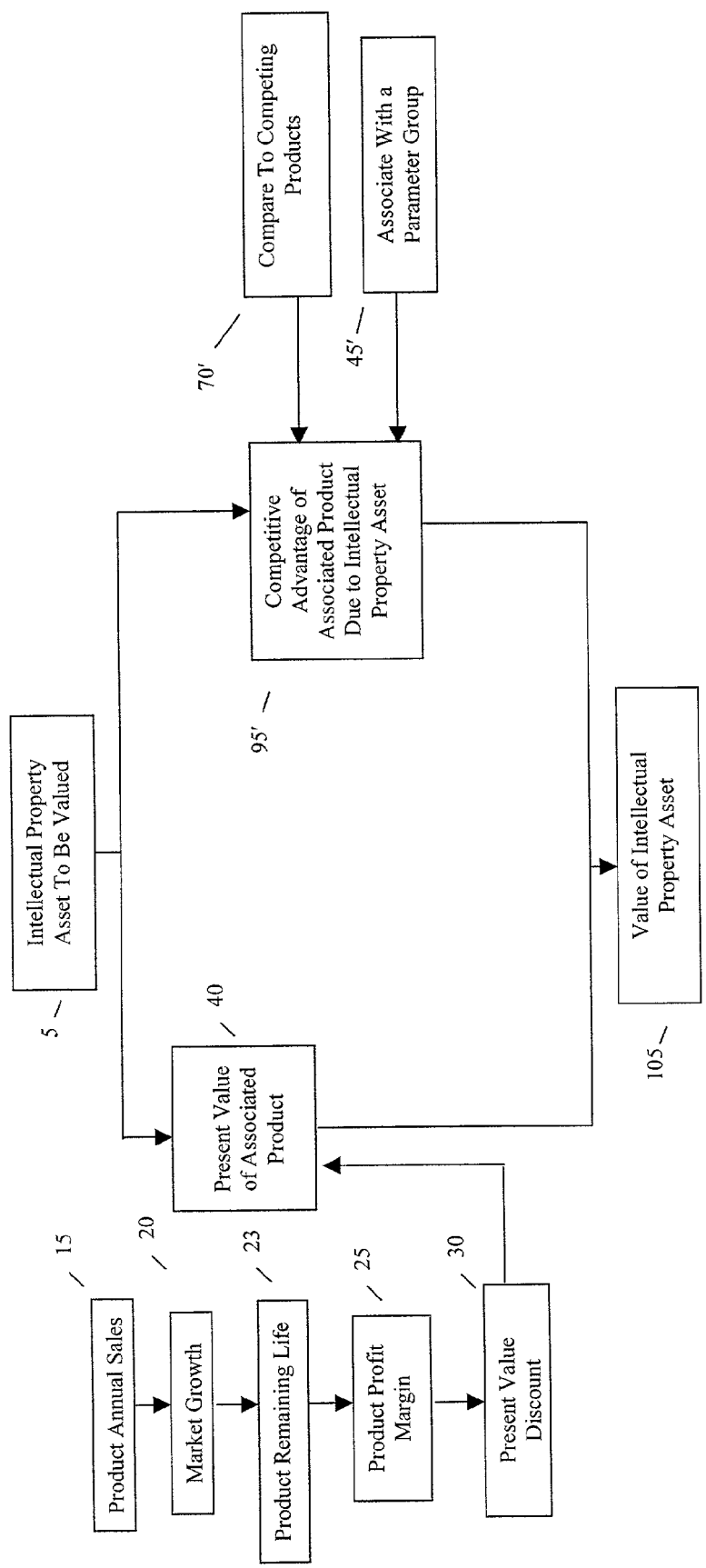
FIG. 3 is an intermediate level flow chart of a first embodiment of the present invention.

FIG. 3 illustrates an intermediate level of the methodology and provides more detail for the steps to be performed in the valuation of an intellectual property asset 5. As illustrated, the competitive advantage of an associated product 95' is a function of: (1) a comparison to competing products 70' based upon parameters relevant to success of associated product in the marketplace, and (2) assocating the intellectual property asset 5 with a parameter group 45' to allocate a portion of the competitive advantage. The determination of the competitive advantage of the associated product 95' due to the intellectual property asset 5 allows the value 105 to be determined as a percentage of the present value of the associated product 40. The underlying calculations for these modules are illustrated in FIG. 1.

According to FIG. 1, the intellectual property asset 5 to be valued is associated with a product (P) 10, i.e. a tangible asset incorporating the intellectual property asset 5, and the present value (PV) 40 of the associated product is calculated. The calculation requires information about the product's annual gross sales (P:GS) 15, the yearly growth of the market (P:MG) 20 as a percent, the length in years of the product's remaining life (P:RL) 23, the product's profit margin (P:PM) 25 as a percent of gross sales, and the applicable present value discount (PVD) 30. This data can be gleaned from public or private data sources and entered into a spreadsheet for easy calculation. The formula for calculating the present value from this data is:

$$P:PV_{1 \ldots P:RL} = P:GS \times (1+P:MG_{1 \ldots P:RL}) \times P:PM_{1 \ldots P:RL} \times PVD_{1 \ldots P:RL}$$

$$P:PV = P:PV_1 + P:PV_2 + P:PV_3 + \ldots P:PV_{P:RL}$$

The intellectual property asset 5 is also associated with one of the three primary parameter groups 45 based on the type of intellectual property that is being valued. The three parameter groups are technical, reputational and operational, and each includes a distinct group of intellectual property assets, the technical parameter group, the reputational parameter group. The operational parameter group representing the various and distinct forms of intellectual property. The technical group includes utility patents (not including method of business patents), functional software copyrights, and technical trade secrets. The reputational group includes trademarks, trade names and brand names. The operational group includes business method patents and proprietary business processes. If the intellectual property asset to be valued is a utility patent, then the technical parameter group should be evaluated. Similarly, if the asset is a trademark or business method, then the reputational or operational groups should be evaluated, respectively.

Once the association is made, a parameter group weight, (TP'G:W), (RP'G:W), or (OP'G:W) 50, i.e. technical, reputational, or operational parameter group weight, respectively, is calculated from data obtained about expenditures on research and development (R&D$), advertising (AD$), and business innovation (BI$). The default formulas for determining the technical parameter group weight (TP'G:W), reputational parameter group weight (RP'G:W), and operational parameter group weight (OP'G:W) are:

$$TP'G:W = R\&D\$/(R\&D\$+AD\$+BI\$)$$

$$RP'G:W = AD\$/(R\&D\$+AD\$+BI\$)$$

$$OP'G:W = BI\$/(R\&D\$+AD\$+BI\$)$$

The parameter group weights 50 allow a portion of the present value of the associated product 40 to be allocated to one of the three distinct groups of intellectual property assets. The value of a given intellectual property asset is thus calculated relative to the value of its related intellectual property group at the exclusion of the other groups. For example, a patent, i.e. a technical group asset, that is associated with a product can be valued despite the presence of a strong trademark, i.e. a reputational group asset, that would otherwise inflate or deflate a valuation.

Within each parameter group there is a prime parameter (PP') and a parameter set (P'S) comprised of sub-parameters (SubP'). In the technical parameter group, the prime parameter is price (PrP') and the parameter set is a set of performance parameters (PfP's). Sub-parameters may include any number of relevant or discrete performance capabilities. In the reputation parameter group, the prime parameter is customer recognition (CrP') and the parameter set is a set of customer impression parameters (CiP's). In the operational parameter group, the prime parameter is the operation cost (OcP') and the parameter set is a set of operational efficiency parameters (OeP's).

According to the methodology, the prime parameter and parameter set must be weighted 60 based on the number of parameters (NP') contained in the parameter group. The prime parameter weight equals the parameter set weight when the total number of parameters is two. The prime parameter weight decreases and the parameter set weight increases as the number of sub-parameters increases. This adjustment is necessary to limit the increase in the prime parameter weight due solely to the increase in the number of sub-parameters in the parameter set. The percentage decrease in prime parameter weight and percentage increase in parameter set weight is based on a multiple (M) of the number of parameters. The default value for M is five. The default formulas for calculating the prime parameter weight and the parameter set weight are:

$$PP':W=0.50\times(1-((M\times NP')/100))$$

$$P'S:W=0.50\times(1+((M\times NP')/100))$$

If sub-parameters exist, their respective weights can be determined as fractions of the parameter set weight.

Once the prime parameter weight and parameter set weight have been determined 60, their relative weights 65 can then be calculated using the parameter group weight 50 determined earlier. The formulas are:

$$PP':RW=PP':W\times P'G:W$$

$$SubP':RW=(P'S:W\times P'G:W)/(NP'-1) \text{ [if SubP':Ws are equal]}$$

$$SubP':RW=(SubP':W/P'S:W)\times P'G:W\times P'S:W \text{ [if SubP':Ws are not equal]}$$

Another step of the methodology is to calculate the relative competitive advantage 95 of the intellectual property asset 5 as compared to related intellectual property assets 70. There are two types of related intellectual property assets: substitute intellectual property assets (SIPA) and complementary intellectual property assets (CIPA). Substitute intellectual property assets are intellectual property assets incorporated in competing products which are associated with the same parameter as the intellectual property asset 5 to be valued. Complementary intellectual property assets are intellectual property assets incorporated in the associated product 10 which are associated with the same parameter group as the intellectual property asset 5 to be valued. These assets are compared based upon quantifiable parameter measures that define the asset and are relevant to product sales in the marketplace.

There are three types of parameter measures: physical measures, psychological measures and estimation measures. Physical measures provide the most objective parameter comparisons and should be used whenever possible. Some parameters, such as design aesthetics, cannot be physically measured. For these parameters, psychological measures should be used and can be based on consumer focus groups. When it is not possible or too costly to obtain physical or psychological measures, estimation measures can be used. Estimation measures are generally based on a numerical scale.

Some parameters might be interdependent, for example size and weight, and the combination of these parameters might produce different values than if the parameters were valued separately as the methodology does by default. Regression analysis or neural network software can be used to analyze the independence or interdependence of parameters. Regardless, a spreadsheet can be used to organize all of the parameter data for the sets of substitute intellectual property assets and complementary intellectual property assets and the formulas can be entered for easy calculation.

The methodology generally calculates the relative competitive advantage 95 of the intellectual property asset 5 in three steps. First, base competitive advantages 75, 80 are calculated for the intellectual property asset 5 and each complementary intellectual property asset by comparing these assets to competing assets. Second, weighted competitive advantages 85, 90 are calculated for the intellectual property asset to be valued and each complementary intellectual property asset by factoring the base competitive advantages 75, 80 by the corresponding relative parameter weight 65. Third, relative competitive advantages 95, 100 are calculated for the intellectual property asset to be valued and each complementary intellectual property asset by dividing the weighted competitive advantages 85, 90 of each by the sum of the weighted competitive advantages.

The detailed methodology for calculating the base competitive advantages 75, 80, first calculates an average value (AvV) 72 for the substitute intellectual property assets and for the substitute complementary intellectual property assets (SCIPA) 73, and then compares these average values 72, 73 to the actual values (AcVs) 71, 74 of the intellectual property asset and complementary intellectual property assets to determine the base competitive advantages 75, 80 as a percentage variation. The substitutes for the complementary intellectual property assets are intellectual property assets incorporated in competing products which are associated with the same parameters as the complementary intellectual property assets. The values represent quantitative measurements of the characteristic of the product, such as size, weight, speed, etc., if relevant in the marketplace. The formulas are as follows:

$$IPA:BCA=(IPA:AcV-SIPA:AvV)/SIPA:AvV$$

$$CIPA:BCA=(CIPA:AcV-SCIPA:AvV)/SCIPA:AvV$$

The next step in determining the relative competitive advantages 95, 100 is to calculate weighted competitive advantages (WCA) 85, 90 for the intellectual property asset to be valued (IPA:WCA) and the complimentary intellectual property assets (CIPA:WCA) using the relative parameter weights calculated earlier 65. The formulas are as follows:

$$IPA:WCA=IPA:BCA\times IPA:P':RW$$

$$CIPA:WCA=CIPA:BCA\times CIPA:P':RW$$

The formulas for calculating the intellectual property asset's relative competitive advantage (IPA:RCA) 95 and complementary intellectual property assets' relative competitive advantage (CIPA:RCA) 100 first calculate a total weighted competitive advantage (T:WCA) for the parameter group. The total weighted competitive advantage for the parameter group is the sum of all of the weighted competitive advantages of the intellectual property asset to be valued and the complementary intellectual property assets. The relative competitive advantages 95, 100 are calculated by dividing the weighted competitive advantage 85, 90 by the total weighted competitive advantage and then multiplying the quotient by the associated parameter group weight (P'G:W) 50 determined earlier. The formulas for calculating an intellectual property asset's relative competitive advantage 95 and a single complementary intellectual property asset's relative competitive advantage 100 are:

$$IPA:RCA=(IPA:WCA/T:WCA)\times P'G:W$$

$$CIPA:RCA=(CIPA:WCA/T:WCA)\times P'G:W$$

The final step in the methodology is to calculate the value of the intellectual property asset (IPA:V) 105 from the product's present value (P:PV) 40 and the intellectual property asset's relative competitive advantage (IPA:RCA) 95 compared to related intellectual property assets. The value of complementary intellectual property assets (CIPA:V) can also be determined from the product's present value 40 and the complementary intellectual property assets' relative competitive advantages (CIPA:RCA) 100. The formulas are as follows:

$$IPA{:}V = P{:}PV \times IPA{:}RCA$$

$$CIPA{:}V = P{:}PV \times CIPA{:}RCA$$

If the intellectual property asset 5 is associated with multiple products, an intellectual property asset value 105 can be calculated for each product and the results summed to calculate a total intellectual property asset value. If the intellectual property asset 5 is associated with multiple parameters, the intellectual property asset's relative competitive advantage 95 is calculated for each parameter and the results are summed to calculate total value. If multiple intellectual property assets are associated with a single parameter, a relative competitive advantage 95 is calculated for that parameter and divided among the intellectual property assets to calculate their individual values.

The value of the intellectual property asset 5 can also be adjusted to account for the degree of security associated with title to the asset. This title security adjustment will decrease value of the intellectual property asset by less than 5% for intellectual property rights which are highly secure and over 95% for intellectual property rights which are highly insecure. The title security adjustment is calculated by first assigning a value between 1 (low) and 10 (high) to five variables that generally determine the strength of title in intellectual property of assets. These five variables are: Scope of Rights; Duration of Rights; Infringement Impunity; Infringement Detection; and Infringement Enforcement. Scope of rights measures the breadth of protection provided to the intellectual property asset. Duration of rights measures the remaining period of intellectual property asset protection. Infringement impunity measures the impunity of the intellectual property asset from reverse engineering and unauthorized use or reproduction. Infringement detection measures the ability to detect infringement of the intellectual property asset if it occurs. Finally, infringement enforcement measures the ability to enforce rights in the intellectual property asset through legal and non-legal means. The title security adjustment equals the sum of these values divided by 50.

Title security adjustment is an estimation measure which can distort other, more objective, measures. In addition, to properly account for the effect of the title security adjustment on the value of an intellectual property asset, the title security adjustment must also be calculated for substitute and complementary intellectual property assets. For these reasons, title security adjustment should only be used when there is significant concern over the title security of the intellectual property asset.

Figure 4:
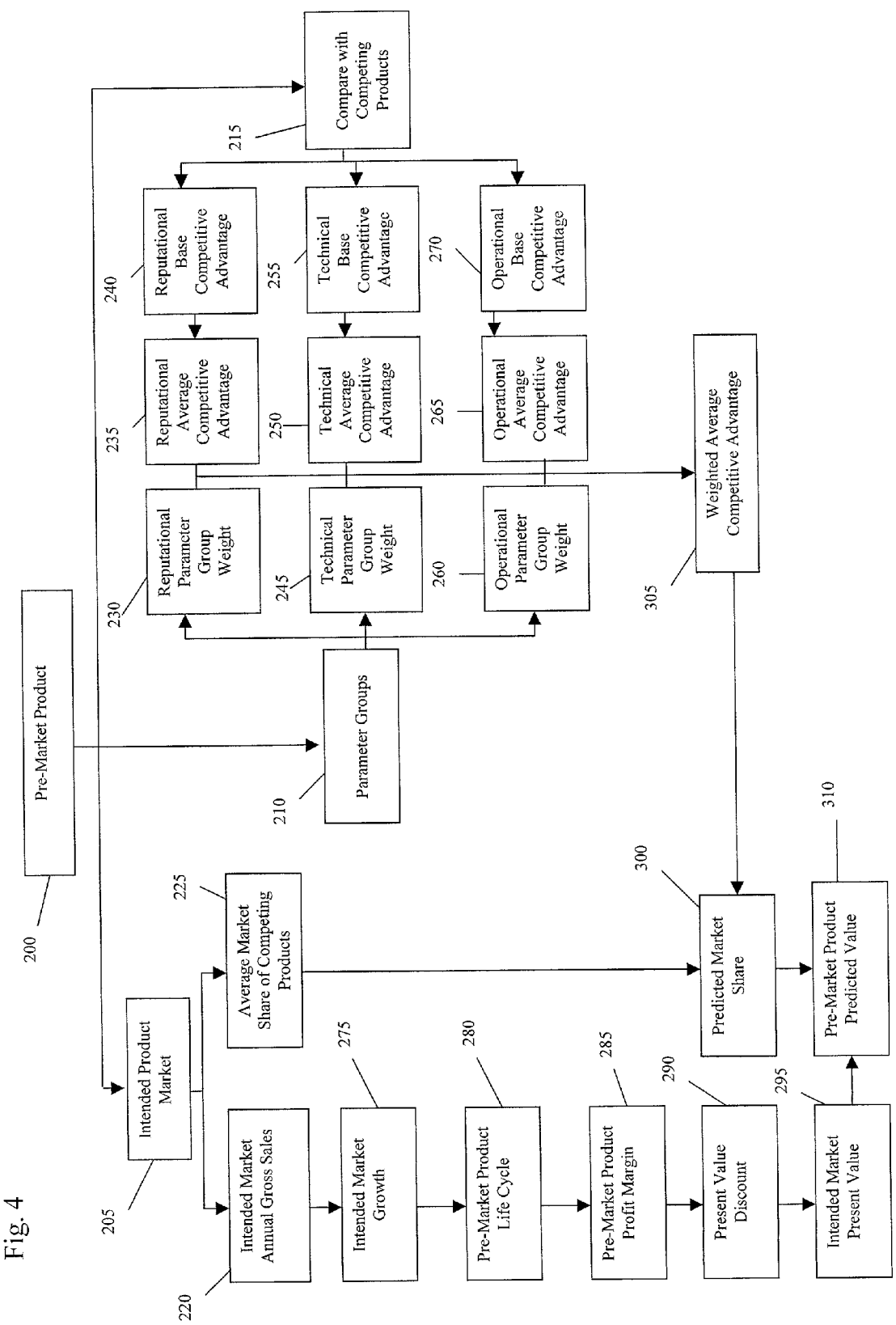
FIG. 4 is a detailed flow chart of a second embodiment of the present invention.
Figure 5:
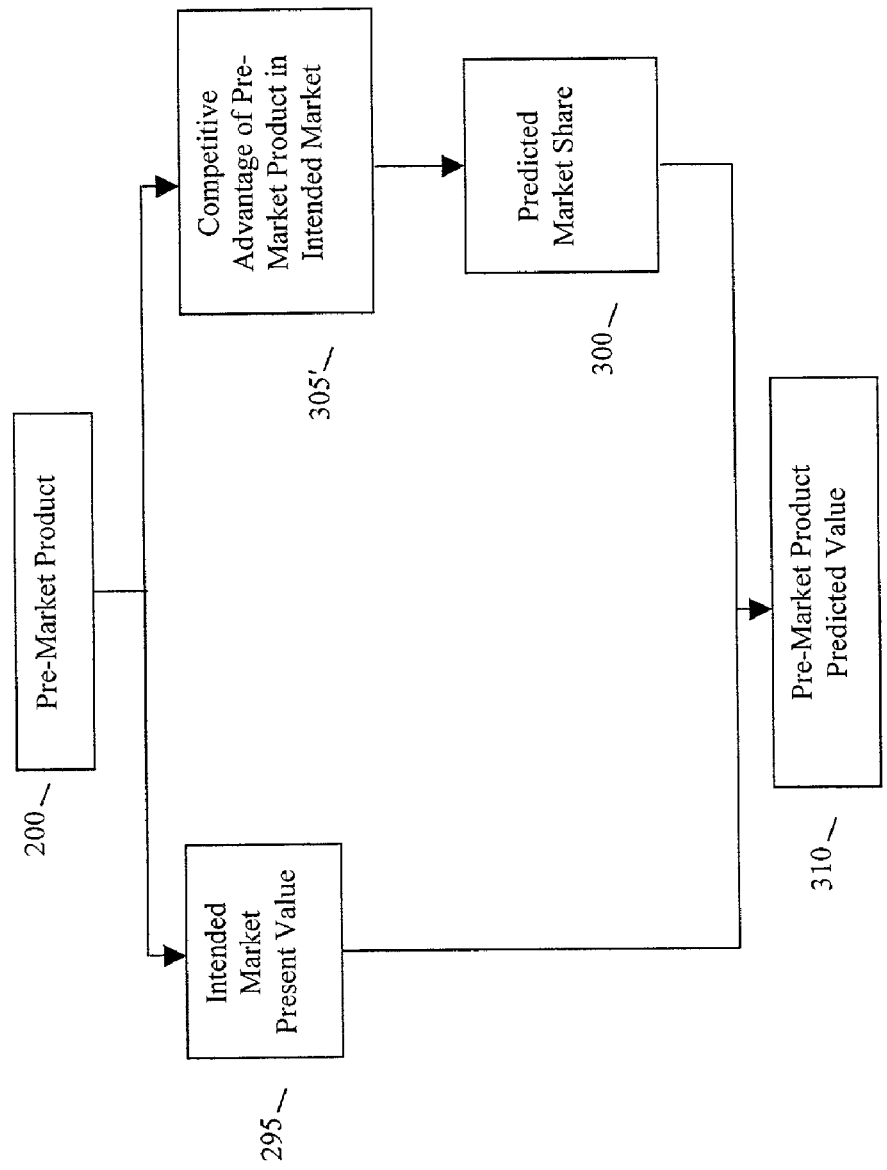
FIG. 5 is a high level flow chart of a second embodiment of the present invention.

FIG. 4 illustrates in detail how the methodology can be used to determine the value of a pre-market product (PMP) 200. FIG. 5 illustrates that the primary modules necessary for computing the pre-market product predicted value 310 are: (1) the present value of an intended market 295 for the pre-market product, (2) the competitive advantage 305 of the pre-market product in the intended market, and (3) the predicted market share 300 of the pre-market product 200 in its intended market.

Figure 6:
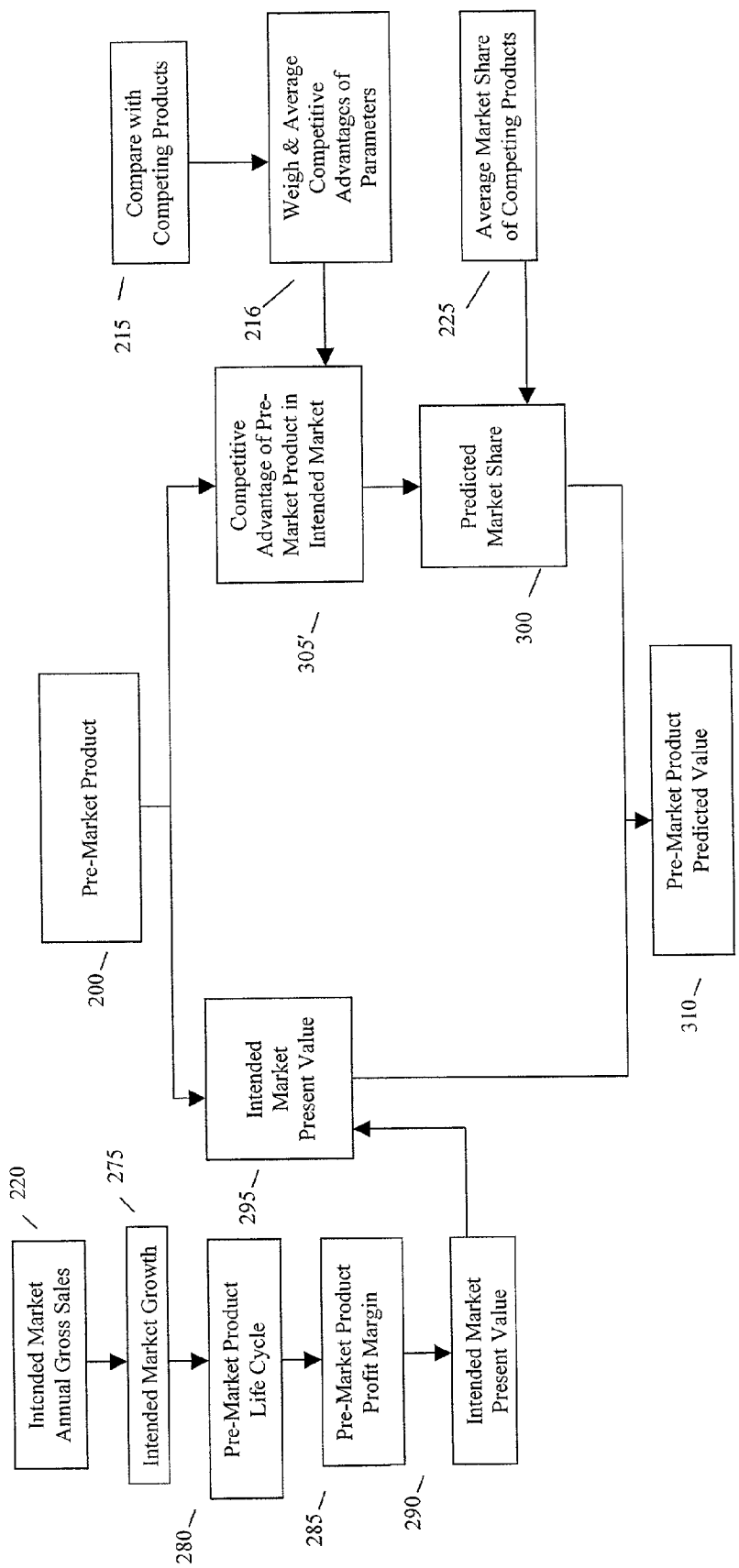
FIG. 6 is an intermediate level flow chart of a second embodiment of the present invention.

According to FIG. 6, the intended market present value 295 is calculated as a function of the intended market annual gross sales 220, the intended market growth 275 annually as a percentage, the pre-market product life cycle 280, the pre-market product profit margin 285 as a percent of gross sales, and an applicable present value discount 290. The competitive advantage 305 of the pre-market product is computed by comparing the pre-market product to competing products 215 on each of the identified relevant parameters. For each parameter, the target value for the pre-market product is compared to the average value for competing products and the results are weighed and averaged 216 to determine the competitive advantage of the pre-market product in the intended market 305'. Finally, the pre-market product's predicted market share 300 is calculated by comparing the competitive advantage of the pre-market product in the intended market 305' and the average market share of competing products 225. The pre-market product predicted value 310 is computed by multiplying the pre-market product predicted market share 300 by the intended market present value 295.

FIG. 4 describes in detail the steps and calculations required for each of the modules in determining the predicted value of the pre-market product 310'. One step is to associate the pre-market product 200 with an intended market (PM) 205 where the pre-market product will eventually be placed. After the association with an intended market 205, it is possible to determine the intended market present value (PM:PV) 295 from information about the market obtained from outside sources. The information that is needed is the current annual gross sales (PM:GS) 220 in the market in dollars; the market growth (PM:MG) 275 as a percent each year; the estimated pre-market product life cycle (PMP:LC) 280; the pre-market product profit margin (PMP:PM) 285 as a percentage of sales; and the appropriate present value discount (PVD) 290. The formula for calculating the product market present value 295 is:

$$PM{:}PV_{1\ldots PMP{:}LC} = PM{:}GS \times (1+PM{:}MG_{1\ldots PMP{:}LC}) \times PMP{:}PM_{1\ldots PMP{:}LC} \times PVD_{1\ldots PMP{:}LC}$$

$$PM{:}PV = PM{:}PV_1 + PM{:}PV_2 + PM{:}PV_3 + \ldots PM{:}PVP_{PMP{:}LC}$$

The product market present value 295 is a summation of the product market's present value for each year of the pre-market product life cycle 280.

Another step is to associate the pre-market product 200 with the three parameter groups 210. These parameter groups are the reputational, technical, and operational parameter groups discussed above. From this association 210, it is possible to calculate the reputational parameter group weight (RP'G:W) 230, technical parameter group weight (TP'G:W) 245, and operational parameter group weight (OP'G:W) 260. The parameter group weights 230, 245, 260 are calculated from information obtained about expenditures on research and development (R&D$), advertising (AD$), and business innovation (BI$). The formulas are:

$$TP'G{:}W = R\&D\$/(R\&D\$+AD\$+BI\$)$$

$$RP'G{:}W = AD\$/(R\&D\$+AD\$+BI\$)$$

$$OP'G{:}W = BI\$/(R\&D\$+AD\$+BI\$)$$

The next step is to calculate the base competitive advantages for each parameter group, i.e. the reputational base competitive advantage 240, the technical base competitive advantage 255, and the operational case competitive advantage 270. To calculate these base competitive advantages 240, 255, 270, the pre-market product must be associated and compared with competing products (CP) 215. Competing products are products with which the pre-market product will compete in the product market 205. Next, the competing products are compared based upon relevant parameters in the three parameter groups. This comparison can be performed in a spreadsheet, making the calculation of the base competitive advantages 240, 255, 270 simple. The base competitive advantage calculations 240, 255, 270 require that an average value for the competing products (CP:AvV) be calculated for each parameter in the three parameter groups. The average value for each parameter of the competing products is then compared to the target value for the pre-market product (PMP:TV) to calculate the parameter base competitive advantage (P':BCA). The target values are quantitative representations of the parameters, such as a product's weight, size, speed, efficiency, etc., if relevant in the marketplace. The formula for calculating each parameter base competitive advantage is:

$$P':BCA=(PMP:TV-CP:AvV)/CP:AvV$$

Once the parameter base competitive advantages 240, 255, 270 have been calculated, each parameter group average competitive advantage (P'G:ACA) 235, 250, 265 can then be calculated. The average competitive advantage 235, 250, 265 is the sum of all of the parameter base competitive advantages 240, 250, 265 divided by the number of parameters (NP') in that group. The formula for calculating a parameter group average competitive advantage is:

$$P'G:ACA=(P'_1:BCA+P'_2:BCA+P'_3:BCA+\ldots P'_n:BCA)/NP'$$

Using the average competitive advantages 235, 250, 265, a weighted average competitive advantage (WACA) 305 can be calculated from the reputational, technical, and operational parameter group weights 230, 245, 260 determined earlier. The formula is as follows:

$$PMP:WACA=(TP'G:ACA \times TP'G:W)+(RP'G:ACA \times RP'G:W)+(OP'G:ACA \times OP'G:W)$$

Before determining the pre-market product predicted value 310, the predicted market share must be calculated 300. The calculation of the pre-market product predicted market share (PMP:PredMS) 300 begins with the calculation of the product market average market share (PM:AvMS) 225. This calculation is simply one hundred (100) divided by one plus the number of substitute products (NSP), or graphically, PM:AvMS=100/(NSP+1). To calculate the predicted market share 300, the average market share 225 is multiplied by the weighted average competitive advantage 305 plus one (1) as follows:

$$PMP:PredMS=(1+PMP:WACA) \times PM:AvMS$$

The final calculation for determining the pre-market product predicted value (PMP:PredV) 310 consists of multiplying the product market present value 295 times the predicted market share 300, or graphically, PMP:PredV=PM:PV×PMP:PredMS.

The valuation of a pre-market product can be used in four related ways. First, the methodology can be used to value different parameter configurations of a pre-market product to determine which configuration provides the greatest return on total investment in the pre-market product. When the method is used in this way, each parameter configuration of pre-market product is viewed as a distinct aggregation of parameter values. Second, the methodology can be used to select among alternative investments in the creation of new intellectual property assets to be incorporated in pre-market products. When the invention is used in this way, each investment is viewed as a trade among alternative inchoate intellectual property assets. Third, the methodology can be used to position a pre-market product in the product market. When the method is used in this way, each market position is viewed as an alternate set of parameter values. Fourth, the methodology can be used to price a pre-market product in the product market according to the competitive advantage value which PMP provides customers. When the method is used in this way, each market price is viewed as a trade among levels of competitive advantage.

The default calculations in the method assume a correlation between a product's average competitive advantage and its market share. If a product enjoys a positive 25% average competitive advantage, the assumption is that the product will have a market share 25% greater than the average market share. If a product has a negative 25% average competitive advantage, the assumption is that the product will have a market share 25% less than the average market share. Regression analysis or neural network software can be used to test and refine the correlation between a product's average competitive advantage and its market share. If these tools are not available, or too costly to use, the default method of one to one between competitive advantage and market share can be applied. The pre-market product predicted value can be adjusted for risks such as development, fabrication, marketing and sales uncertainty. To adjust the pre-market product predicted value for risk, a risk factor is determined for each type of risk and the cumulative or average risk factor is used to reduce the pre-market product predicted value.

Figure 7:
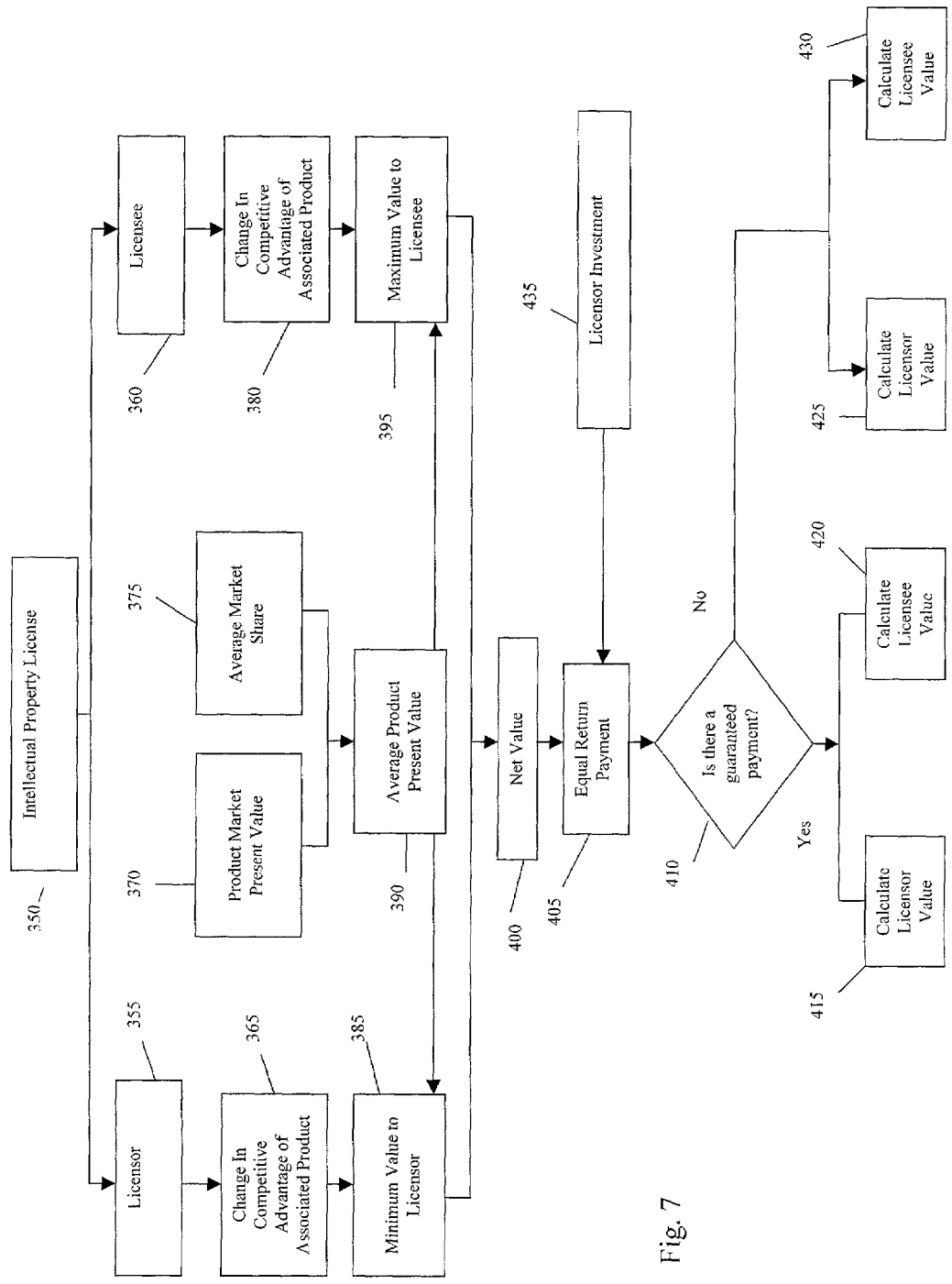
FIG. 7 is a detailed flow chart of a third embodiment of the present invention.
Figure 8:
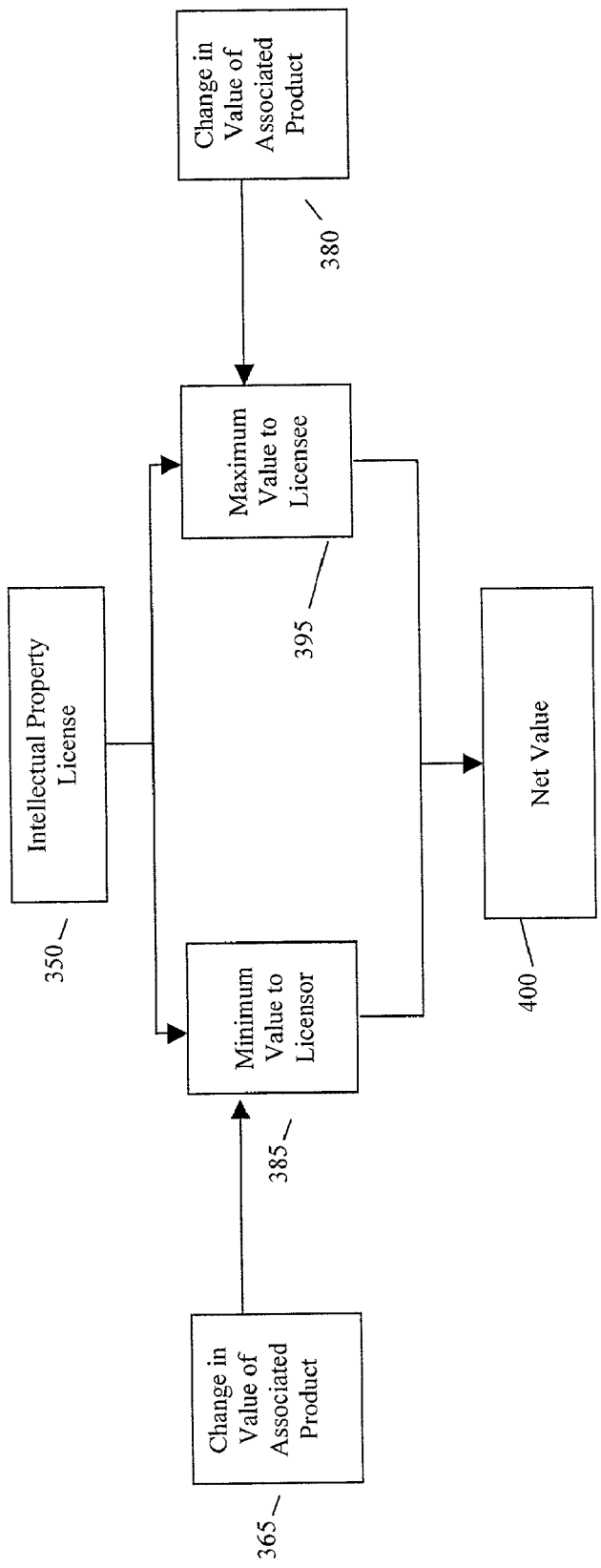
FIG. 8 is a high level flow chart of a third embodiment of the present invention.
Figure 9:
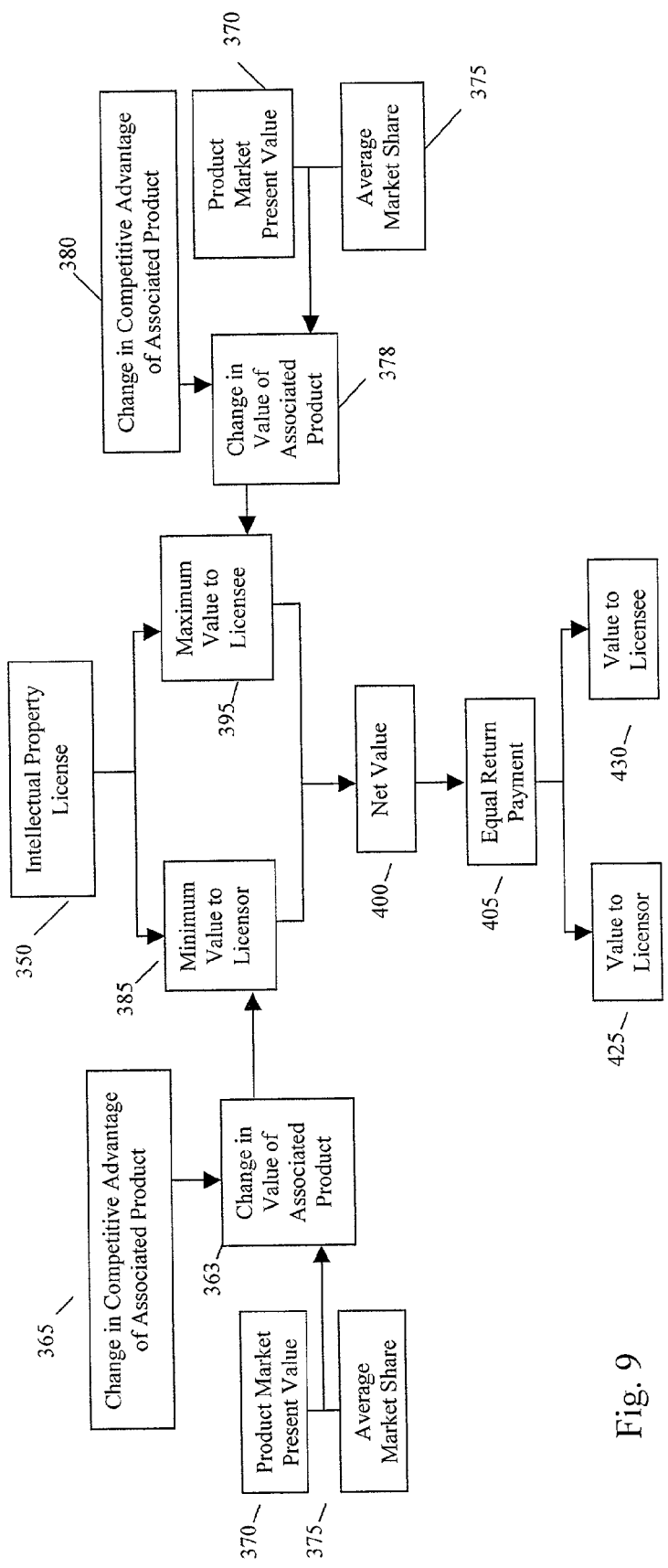
FIG. 9 is an intermediate level flow chart of a third embodiment of the present invention.

FIG. 7 illustrates how the methodology can be used to value an intellectual property license (IPL) 350 between a licensor 355 and licensee 360. FIG. 8 illustrates the high level methodology with the modules required for computing the net value of a license 400 as a function of the minimum value to licensor 385 and maximum value to licensee 395 as determined from an analysis of the change in value of a tangible asset 363, 378 (i.e. a product) associated with an intellectual property asset subject to the license 350. According to FIG. 9, the change in value of an associated product 363, 378 due to the intellectual property asset that is the subject of the license is used to determine the value of the license. The change in value of an associated product 363, 378 is a function of (1) the product market present value 370, (2) the average market share 375, and (3) the changes 380, 365 in the competitive advantage of the tangible asset as a result of the license. The net value of the license 400 is used to determine an equal return payment 405 that provides an equal return on investment to both parties to the license 350 and is used to establish the value to the licensor 425 and the value to the licensee 430.

According to FIG. 7, the method determines the license net value 400 to both a given licensor (LR) 415, 425 and a given licensee (LE) 420, 430 depending on presence of guaranteed payments. First, the change in competitive advantage of an associated product 365 of the licensor and the change in competitive advantage of an associated product 380 of the licensee must be calculated. This can be accomplished by using the preceding embodiments of the methodology to determine the necessary elements. For example, the licensor's change in competitive advantage (LR:CAΔ) 365 is calculated by subtracting the licensor's average competitive advantage (ACA) with the intellectual property license (+IPL) from the licensor's average competitive advantage without the intellectual property license (−IPL) and multiplying the difference by the relevant parameter group weight (P'G:W). The formula is as follows:

$$LR:CA\Delta = [(-IPL):ACA-(+IPL):ACA] \times P'G:W$$

The licensee's change in competitive advantage (LE:CAΔ) 380 is calculated by subtracting the licensee's average competitive advantage (ACA) without the IPL (~IPL) from the licensee's average competitive advantage with the IPL (+IPL) and multiplying the difference by the relevant parameter group weight (P'G:W). The formula is as follows:

$$LE{:}CA\Delta=[(+IPL){:}ACA-(\sim IPL){:}ACA]\times P'G{:}W$$

It is also necessary to calculate the average product present value (AvP:PV) 390 by multiplying the product market present value (PM:PV) 370 by the average market share (AvMS) 375. The formula is thus:

$$AvP{:}PV=PM{:}PV\times AvMS$$

Once the preceding calculations have been made, the minimum value (LR:MinV) 385 to the licensor and the maximum value (LE:MaxV) 395 to the licensee can be determined. The licensor's minimum value 385 is the amount which the licensor must earn to compensate for its loss in competitive advantage due to the license. In other words, the licensor minimum value 385 equals the licensor's loss of product present value due to the license. The licensor minimum value 385 is calculated only if the licensor is a for-profit organization and the licensee is a competitor firm. The licensor minimum value 385 is equal to zero if the licensor is a not-for-profit organization or the licensee is not a competitor firm. The licensor minimum value 385 is calculated by multiplying the licensor's change in competitive advantage 365 by the average product present value 390, or LR:MinV=LR:CA$\Delta\times$AvP:PV.

The licensee's maximum value 395 is the maximum amount which the licensee 360 can earn from its increase in competitive advantage due to the license 350. The licensee maximum value 395 must be calculated regardless of licensor 355 status or licensor 355 competition with licensee 360. The licensee maximum value 395 equals licensee's maximum increase in product present value due to the intellectual property license 350. The formula for calculating licensee maximum value 395 is the product of the licensee change in competitive advantage 380 and the average product present value 390, or LE:MaxV=LE:CA$\Delta$ $\times$AvP:PV.

The next step in valuing the intellectual property license 350 is to calculate an equal return payment (ERP) 405. The equal return payment 405 is a payment by the licensee 360 to the licensor 355 which will provide both the licensee 360 and licensor 355 an equal return on their respective investments in the license 350. The equal return payment 405 assumes that licensor 355 and licensee 360 share an equal risk in the license 350. An equal return payment 405 based solely on licensee sales (i.e. "running royalties") divides risk equally between the licensor 355 and licensee 360. An equal return payment 405 which includes guaranteed payments shifts risk from the licensor 355 to the licensee 360.

The first step in the calculation of an equal return payment 405 is to calculate the intellectual property license net value (NV) 400. The net value 400 is the value of the license 350 after deducting the licensor minimum value 385 from the licensee maximum value 395. The net value 400 assumes that the licensor 355 receives a payment equal to the licensor minimum value 385 before licensor return is calculated. The formula is thus IPL:NV=LE:MaxV−LR:MinV.

The next step necessary for determining the final license values is to calculate the licensor investment 435. The licensor investment 435 is the percentage amount of licensor total investment (TI) attributable to the intellectual property asset that is the subject of the license. If the intellectual property asset is currently used by the licensor 355, the licensor total investment 435 is allocated between the licensor's current applications (CA) and the intellectual property license 350. The default allocation divides the licensor total investment 435 equally between the number of current applications (NCA) and the intellectual property license 350. If the intellectual property asset is not currently used by the licensor 355, the full amount of the licensor total investment is allocated to the intellectual property asset. However, if the intellectual property asset is not currently used by the licensor 355, the licensor minimum value will equal zero. Licensing an unused intellectual property asset to a competitor is the same as licensing a used intellectual property asset to a non-competitor. The formula for calculating licensor investment (LR:I) 435 is:

$$LR{:}I=LR{:}TI/(NCA+1)$$

Using the licensor investment 435 and the license net value 400 calculations, an equal return payment can be determined. The equal return payment 405 represents a payment by the licensee 360 to the licensor 355 which provides both parties and equal return on investment in the license 350. The licensor return on investment equals the equal return payment 405 divided by licensor investment 435. The licensee return on investment equals the difference between license net value 400 and the equal return payment 405 divided by the equal return payment 405. For the licensee 360, the equal return payment 405 equals the licensee investment in the license 350. The formulas are as follows:

$$LR{:}ROI=ERP/LR{:}I$$

$$LE{:}ROI=(IPL{:}NV-ERP)/ERP$$

The equal return payment 405 is a measure of the point at which the return on investment to the licensor 355 equals the return on investment to the licensee 360. As the licensor and licensee return on investment are equal, the individual equations can be substituted to solve for the equal return payment 405 as follows:

$$LR{:}ROI=LE{:}ROI$$

$$ERP/LR{:}I=(IPL{:}NV-ERP)/ERP$$

$$ERP^2=LR{:}I(IPL{:}NV-ERP)$$

Solving for ERP, the formula becomes:

$$ERP=-(LR{:}I)\pm\mathrm{sqrt}[(LR{:}I)^2+4(LR{:}I)(IPL{:}NV)] \qquad 2$$

Once the equal return payment 405 has been calculated, the licensor 415, 425 and licensee 420, 430 values can be determined. The methodology takes two separate tracks depending on whether there are guaranteed payments or not 410. If there are no guaranteed payments included in equal return payment 405, licensor value 425 equals the equal return payment 405 and licensee value 430 equals the license net value 400 minus the equal return payment 405. Thus, LR:V=ERP and LE:V=L:NV−ERP.

If guaranteed payments are included in equal return payment 410, further calculation is necessary. To calculate licensor and licensee value 415, 420 when there are guaranteed payments, the actual monetary amount of guaranteed payments (GP$) must be determined. The guaranteed payments are the sum of all required payments under the license to the licensor 355 including license fees, mandatory license payments, and minimum royalties. Next, a guaranteed payment discount factor (DF) must be determined. The discount factor discounts the guaranteed payment to the licensor and is set at a default value of 0.5 (0.5 ×GP$). The licensor and licensee values 415, 420 can be calculated from the equal return payment 405, the amount of the guaranteed payments, and the guaranteed payment discount factor by the following formulas:

$$LR: V = ERP - (DF \times GP\$)$$

$$LE: V = IPL:NV - (ERP - (DF \times GP\$))$$

The basic formula calculates the value of an exclusive license to a given licensor 355 and a given licensee 360. The methodology can also be used to calculate the value of a non-exclusive license to given licensor 355 and multiple licensees 360. When used to calculate the value of a non-exclusive license, the licensor minimum value 385 and licensees' maximum values 395 must take into account the use of the technology by the multiple licensees. The greater the number of licensees, the higher the licensor minimum value 385 will be and the lower the licensees' maximum values 395 will be. The equal return payment 405 can be calculated based on the licensees' average maximum value or the equal return payment 405 can be calculated for each licensee based on that licensee's competitive advantage change 380.

The methodology can also be used to calculate the value of a license 350 when the licensee 360 grants the licensor 355 a cross license. Under these circumstances, the licensor's minimum value 385 would be reduced by the competitive advantage gain to the licensor from the cross license, and the licensee's maximum value 395 would be reduced by the licensee's loss of competitive advantage due to the cross license. The formula can be similarly adjusted to account for the licensee's grant back to the licensor of rights in improvements which the licensee makes to the intangible asset licensed. Here again, the licensor's minimum value 385 would be reduced by the competitive advantage gain to the licensor from the grant back license and the licensee's maximum value 395 would be reduced by the licensee's loss of competitive advantage due to the grant back license.

Under the methodology, a licensor 355 adds greater value to an intellectual property license 350 if the licensor 355 is a non-profit entity, if the license 350 is to a non-competitor, or if the subject of the license is an intellectual property asset which the licensor 355 does not use. If the licensor 355 is a non-profit entity, the licensor 355 will have no minimum value and might have a low investment value due to subsidization of the investment. If the licensee 360 is a non-competitor, or the subject of the license 350 is an intellectual property asset which the licensor 355 does not use, the licensor 355 will also have no minimum value. Although intellectual property licenses between competitors add less potential value to the licensor 355 and licensee 360, the subject matter of a competitor license is likely to provide a licensee 360 with a more direct and immediate competitive advantage.

Although the methodology seeks to minimize the amount of information necessary to value an intellectual property license, it does require information on each competing product. If this information is not available, or too costly to obtain, the methodology can be based on a hypothetical average competing product. When based on a hypothetical average product, the competitive advantage changes can be calculated in terms of the hypothetical average product to approximate the licensor and licensee values.

Figure 11:
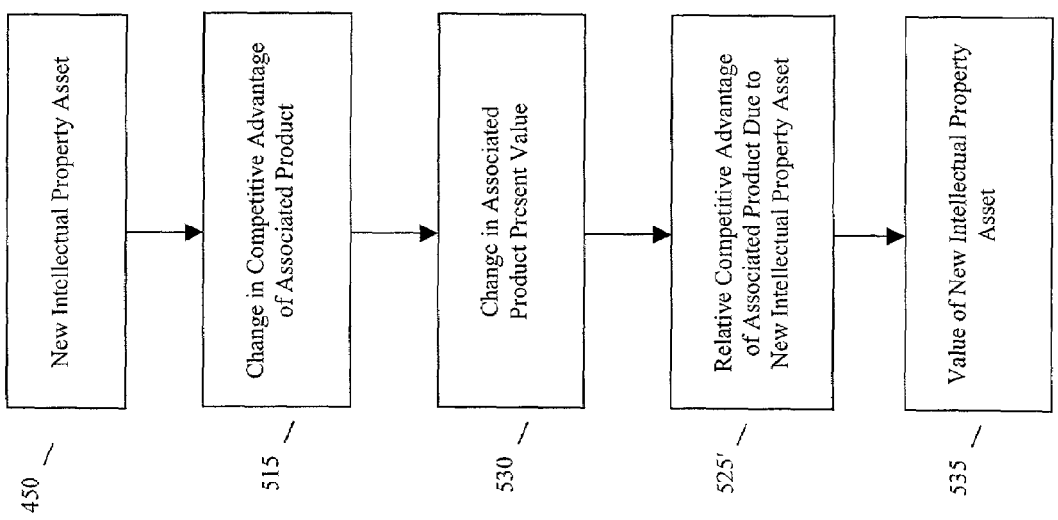
FIG. 11 is a high level flow chart of a fourth embodiment of the present invention.
Figure 12:
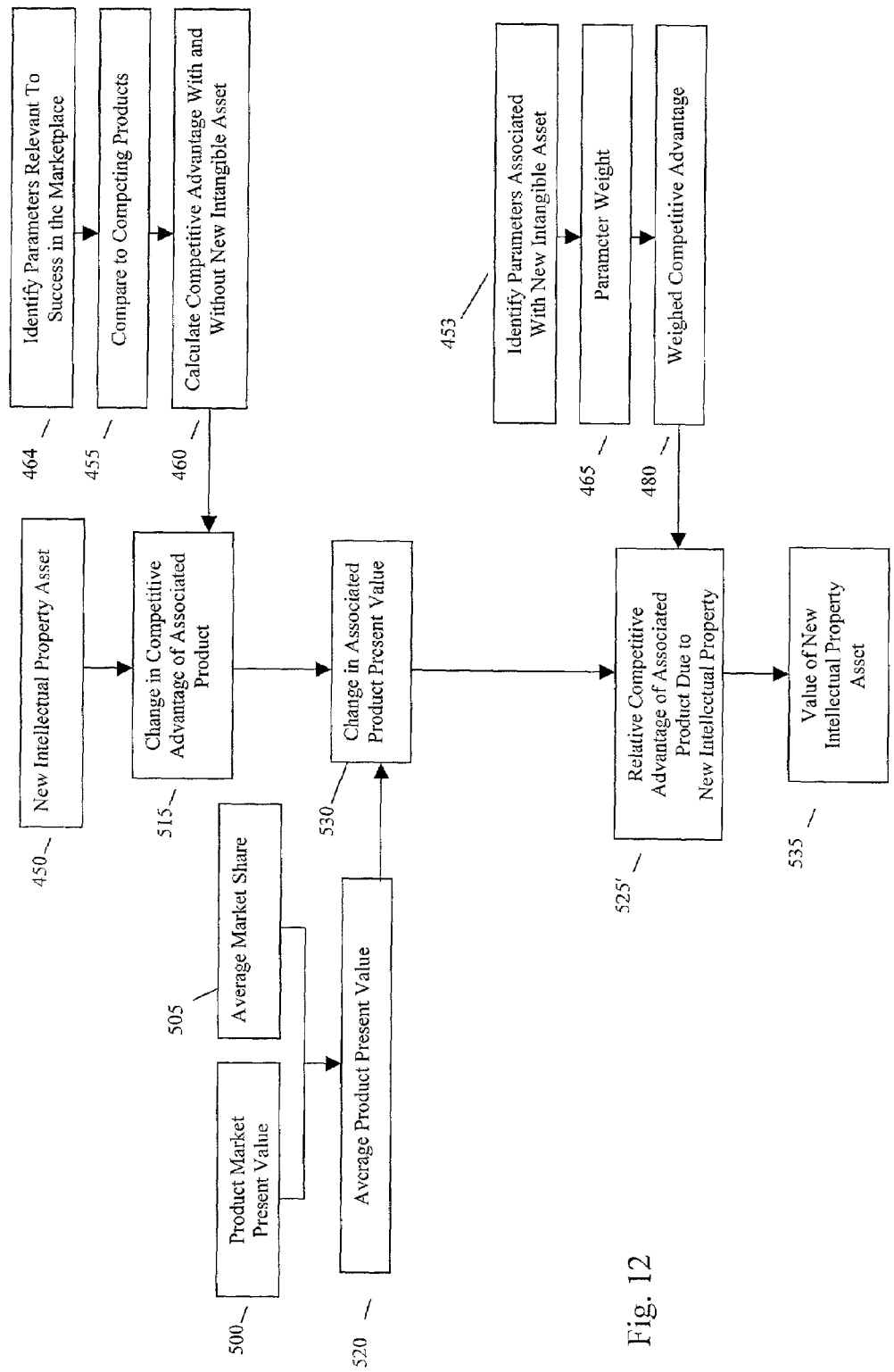
FIG. 12 is an intermediate level flow chart of a fourth embodiment of the present invention.

FIG. 11 illustrates the basic modules required to reach the value 535 of a new intellectual property asset 450. These modules involve a calculation of (1) the change in competitive advantage of an associated product 515, (2) the resultant change in present value of the associated product 530, and (3) the relative competitive advantage 525' or the percent contribution of the new intellectual property asset to the change in present value. FIG. 12 further details the components of the modules and shows that the change in competitive advantage of an associated product 515 is determined after identifying parameters relevant to success in the marketplace 464, comparing those parameters to competing products 455, and calculating the competitive advantage with and without the new intellectual property asset 460. The change in associated product present value 530 is calculated as in the previous embodiments from the product market present value 500 and average market share 505. The relative competitive advantage of the associated product due to the new intellectual property asset 525' is also calculated as previously by determining the weighted competitive advantage 480 from the parameter weight 465 after identifying the parameters associated with the new intellectual property asset 453.

Figure 10:
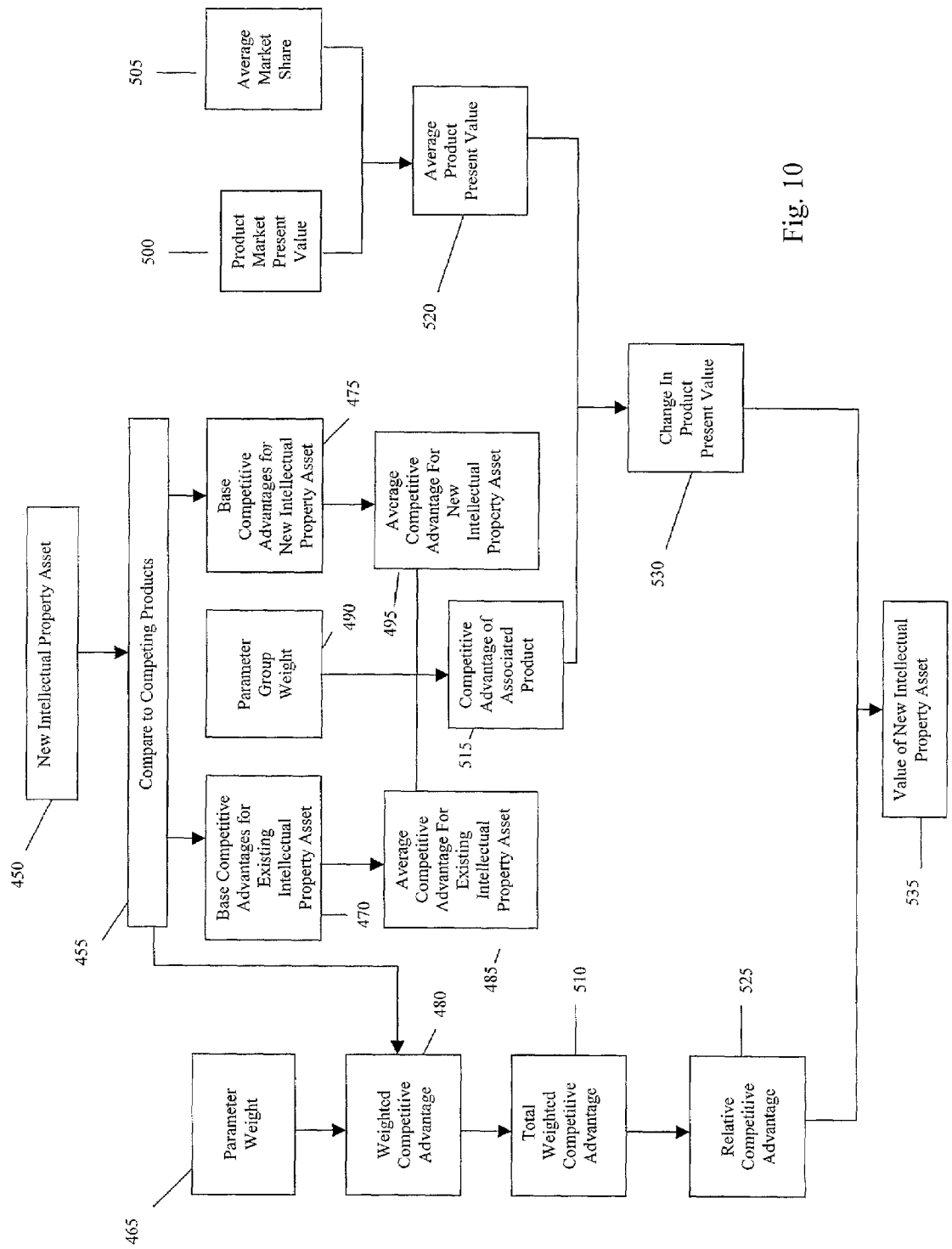
FIG. 10 is a detailed flow chart of a fourth embodiment of the present invention.

FIG. 10 demonstrates in detail how the methodology may be used to value 535 a new intellectual property asset 450. This embodiment of the methodology is based on the change in competitive advantage (CAΔ) 515 due to the difference between the average competitive advantage (ACA) of a product with an existing intellectual property asset (EIPA) and the average competitive advantage of a product with the new intellectual property asset (NIPA). To determine the average competitive advantage of the existing intellectual property asset, it is necessary to first calculate an average value (AvV) for substitute intellectual property assets (SIPA). This is accomplished in the same manner as the embodiments described above by using a spreadsheet to compare parameters of the existing intellectual property asset against competing assets in the marketplace 455. The comparison should include the product with existing intellectual property and with the new intellectual property asset. From these comparisons, the average values for competing assets can be determined as explained previously.

Next, the existing intellectual property asset base competitive advantage (EIPA:BCA) 470 is calculated from the substitute intellectual property asset average value (SIPA:AvV) and the existing intellectual property asset actual values (EIPA:AcV) for each relevant parameter as determined in the comparison 455. The formula is as follows:

$$EIPA:BCA = (EIPA:AcV - SIPA:AvV)/SIPA:AvV$$

From these calculations, the existing intellectual property asset average competitive advantage (EIPA:AVA) 485 can be determined by totaling the existing intellectual property asset base competitive advantages 470 for each parameter and dividing by the number of parameters (NP'). The formula is as follows:

$$EIPA:ACA = (EIPA_1:BCA + EIPA_2:BCA + EIPA_3:BCA + \ldots EIPA_n:BCA)/NP'$$

The calculation of the new intellectual property asset average competitive advantage (NPA:AVA) 495 begins with a determination of the base competitive advantage 475 for all of the parameters through the comparison 460 to competing products. This is accomplished by comparing the competing average value for each parameter, as done previously for the existing intellectual property asset, with the target values (TV) for each corresponding parameter that the new intellectual property asset is expected to achieve. The formula for calculating the base competitive advantage 475 is:

$$NIPA:BCA = (NIPA:TV - SIPA:AvV)/SIPA:AvV$$

The average competitive advantage of the new intellectual property asset 495 is the sum of the base competitive advantages 475 of all of the parameters divided by the number of parameters, as follows:

$$NIPA:ACA=(NIPA_1:BCA+NIPA_2:BCA+NIPA_3:BCA+\ldots NIPA_n:BCA)/NP'$$

Before calculating the change in competitive advantage 515 due to the new intellectual property asset 450, the parameter group weight 490 must be determined. The parameter group weight 490 is calculated as a ratio between the firm's R&D$, AD$ and BI$, just as in the previous embodiments of the methodology. The formulas for the technical, reputational, and operational parameter group weights are, respectively:

$$TP'G:W=R\&D\$/(R\&D\$+AD\$+BI\$)$$

$$RP'G:W=AD\$/(R\&D\$+AD\$+BI\$)$$

$$OP'G:W=BI\$/(R\&D\$+AD\$+BI\$)$$

The change in competitive advantage of the associated product 515 can now be calculated according to the following formula:

$$CA\Delta=(NIPA:ACA-EIPA:ACA)\times P'G:W$$

The competitive advantage change 515 can be used to determine the change in product present value 530 due to the new intellectual property asset. The calculation first requires a determination of the average product present value 520. The average product present value 520 is the present value of an average product in the market as calculated from the product market present value (PM:PV) 500 and the average market share (AvMS) 505. The product market present value can be calculated, as in the second embodiment illustrated by FIG. 4, from information about the market obtained from outside sources. As in FIG. 4, the information that is needed is current annual gross sales (PM:GS) 220 in the market in dollars; the market growth (PM:MG) 275 as a percent each year; the product estimated life cycle (P:LC) 280; the product profit margin as a percentage of sales (P:PM) 285; and the appropriate present value discount (PVD) 290. The formula for calculating the product market's present value 295 is:

$$PM:PV_{1\ldots PMLC}=PM:GS\times(1+PM:MG_{1\ldots PM:LC})\times PM:PM_{1\ldots PMLC}\times PVD_{1\ldots PM.LC}$$

$$PM:PV=PM:PV_1+PM:PV_2+PM:PV_3+\ldots PM:PVP_{PM.LC}$$

The product market's present value is calculated for each year of life cycle and the results are summed to determine the total product market present value 500.

The average market share 505 is a percentage calculated from the number of substitute products (NSP) in the product market. The formula is AvMS=100/(NSP+1). From the average market share 505 and the product market present value 500, the average product present value 520 can be calculate by the formula AvP:PV=PM:PV×AvMS. The change in product present value (P:PVΔ) 530 attributable to the new intellectual property asset 450 can now be calculated by multiplying the change in competitive advantage 515 and the average product present value 520, or P:PVΔ=CAΔ×AvP:PV.

Before calculating the value of the new intellectual property asset 535, the relative competitive advantage 525 must be also be determined. The calculation of the new intellectual property asset's relative competitive advantage 525 begins with the calculation of the parameter weight (P':W) 465. The formula for calculating the parameter weight depends on whether the new intellectual property asset is associated with a prime parameter (PP') or a parameter set (P's) in the comparisons 455, 460. The formula if associated with a prime parameter is:

$$NIPA:P':W=0.50\times(1-(M\times NP')/100))$$

The formula if associated with a parameter set is:

$$NIPA:P':W=(0.50\times(1+((M\times NP')/100)))/(NP'-1)$$

Once the parameter weight 465 has been determined, the new intellectual property asset weighted competitive advantage (NIPA:WCA) 480 can be calculated from its base competitive advantage 460 as follows:

$$NIPA:WCA=NIPA:BCA\times NIPA:P':W$$

This calculation is performed for each parameter and added together to constitute the total weighted competitive advantage (TWCA) 510 of the parameter group. Thus, P'G: TWCA=P'$_1$:WCA+P'$_2$:WCA+P'$_3$:WCA+...P'$_n$:WCA. The formula for calculating the new intellectual property asset's relative comparative advantage (NIPA:RCA) 525 is as follows:

$$NIPA:RCA=NIPA:WCA/P'G:TWCA$$

The value of the new intellectual property asset (NIPA:V) can now be determined by multiplying the new intellectual property asset's relative comparative advantage 525 and the change in product present value 530. The formula is as follows:

$$NIPA:V=NIPA:RCA\times P:PV\Delta$$

The methodology values a new intellectual property asset based on its competitive advantage change 515, and the resulting product present value change 530, that is attributable to the new intellectual property asset. This value alone, however, does not determine whether the new intellectual property asset is a good investment of a firm's resources. To determine the relative worth of an investment in a new intellectual property asset, the value must be compared to the cost of investment and a rate of return calculated. The rate of return on an investment in any new intellectual property asset can be compared to the rate of return on alternative investments in other new intellectual property assets to determine which combination of investments produces the highest overall rate of return. The general formula for calculating the rate of return on an investment in a new intellectual property asset (NIPA) is:

Rate of Return=NIPA Value/Cost of Investment in NIPA

The description of the methodology is based on use by a single firm or entity. The method may also be used by two or more firms engaged in a research and development joint venture. The methodology can be used to value intellectual property assets created in a research and development joint venture, to divide these assets among joint venture partners according to their highest valued uses, and to calculate rates of return on investment to joint venture partners from newly created intellectual property assets.

What is claimed is:

1. A method of valuing an intangible asset using a data processing system, comprising the steps of:
   calculating a monetary value of a tangible asset associated with said intangible asset using said data processing system by;

identifying a parameter dependent on said intangible asset and associated with said tangible asset that is relevant to commercial success in a marketplace;

using said data processing system to calculate the relative contribution of said intangible asset to said competitive advantage of said tangible asset;

imputing into said data processing system the contribution of said parameter to said competitive advantage of said tangible asset as compared to related intangible assets; and using said data processing system to multiply said relative contribution of said intangible asset with said value of said tangible asset;

using said data processing system to determine the competitive advantage of said tangible asset over competing tangible assets as a percentage thereof; and using said data processing system to calculate a value for said intangible asset based upon the relative contribution of said intangible asset to said competitive advantage of said tangible asset; and displaying said value using said data processing system.

2. The method of claim 1, wherein the step of determining a present monetary value of an intended market for said pre-market product comprises the steps of:

determining a total annual gross sales of said intended market for said pre-market product;

determining an annual growth of said intended market as a percent;

determining a life cycle of said pre-market product in years;

determining a profit margin of said pre-market product as a percent of gross sales;

determining a present value discount factor; and summing a multiple of said total annual gross sales, said annual growth, said profit margin, and said present value discount factor over each year of said life cycle of said pre-market product.

3. A method of valuing a pre-market product using a data processing system, comprising the steps of:

using said data processing system to determine the present monetary value of an intended market for said pre-market product;

inputting into said data processing system a plurality of parameters of said pre-market product and a plurality of corresponding parameters of competing products in said intended market;

using said data processing system to compare said plurality of parameters of said pre-market product to said plurality of corresponding parameters of competing products in said intended market and determine a competitive advantage for each said parameter of said pre-market product as a percent variation;

inputting weights for each said competitive advantage of each said parameters into said data processing system and averaging said competitive advantages of the parameters in said data processing system to determine said competitive advantage of said pre-market product in said market;

predicting a market share of said pre-market product based on said competitive advantage calculated by said data processing system; and using said data processing system to calculate a monetary value for said pre-market product by multiplying said predicted market share and said present monetary value of said intended market; and displaying said monetary value using said data processing system.

4. The method of claim 3, wherein the step of predicting a market share of said pre-market product based on said competitive advantage comprises the steps of:

determining an average market share of said market; and multiplying said average market share by said competitive advantage.

5. A method of determining the monetary value of a new intangible asset in a data processing system, comprising the steps of:

using said data processing system to calculate a change in a competitive advantage of a tangible asset associated with said new intangible asset as a percent variation by identifying at least one parameter associated with said tangible asset relevant to commercial success in the marketplace;

using said data processing system to compare said parameter with at least one parameter of at least one competing tangible asset to determine said competitive advantage said tangible asset as a percent variation;

using said data processing system to calculate a competitive advantage for said tangible asset without said new intangible asset as a percent variation;

using said data processing system to calculate a competitive advantage for said tangible asset with said new intangible asset as a percent variation; and using said data processing system to subtract said competitive advantage for said tangible asset without said new intangible asset from said competitive advantage for said tangible asset with said new intangible asset to determine the monetary value, and displaying the monetary value using said data processing system.

6. The method of claim 5, wherein the step of calculating said monetary value by multiplying said change in said competitive advantage of said tangible asset and an average market share in an intended market comprises the steps of:

using said data processing system to calculate a present monetary value of said intended market for said tangible asset;

using said data processing system to calculate said average market share in said intended market as a percent;

using said data processing system to determine an average product present monetary value by multiplying said present monetary value of said intended market by said average market share;

using said data processing system to multiply said average product present monetary value and said change in said competitive advantage.

7. A method of valuing an intangible asset using a data processing system, comprising the steps of:

associating said intangible asset with a tangible asset;

inputting into said data processing system a total annual gross sales in a market for said tangible asset;

inputting into said data processing system an annual percent growth of the market;

inputting into said data processing system a life cycle in years of said tangible asset;

inputting into said data processing system a profit margin of said tangible asset as a percent of gross sales;

inputting into said data processing system a present value discount factor;

using said data processing system to sum a multiple of said total annual gross sales, said annual percent growth, said profit margin, and said present value discount factor over each year of said life cycle of said tangible asset;

identifying at least one parameter associated with said tangible asset relevant to commercial success in the market;

using said data processing system to compare said parameter with at least one parameter of at least one competing tangible asset to determine a competitive advantage of said tangible asset as a percent variation;

identifying a parameter dependent on said intangible asset and associated with said tangible asset that is relevant to commercial success in the market;

using said data processing system to calculate said relative contribution of said intangible asset to said competitive advantage of said tangible asset based on a contribution of said parameter to said competitive advantage of said tangible asset; and using said data processing system to multiply said relative contribution of said intangible asset with said value of said tangible asset to determine the value of said intangible asset, and displaying said value of said intangible asset using said data processing system.

8. A method of valuing a pre-market product using a computer program, comprising the steps of:

inputting into said data processing system a total annual gross sales of an intended market for said pre-market product;

inputting into said data processing system an annual growth of said intended market as a percent;

inputting into said data processing system a life cycle of said pre-market product in years;

inputting into said data processing system a profit margin of said pre-market product as a percent of gross sales;

inputting into said data processing system a present value discount factor;

using said data processing system to sum a multiple of said total annual gross sales, said annual growth, said profit margin, and said present value discount factor over each year of said life cycle of said pre-market product;

using said data processing system to compare a plurality of parameters of said pre-market product to a plurality of corresponding parameters of competing products in said intended market to determine a competitive advantage for each said parameter of said pre-market product as a percent variation;

inputting weights for each of said plurality of parameters of said pre-market product into said data processing system and then averaging said competitive advantages of the parameters to determine said competitive advantage of said pre-market product in said market;

using said data processing system to determine an average market share of said market;

using said data processing system to multiply said average market share by said competitive advantage; and using said data processing system to calculate a monetary value for said pre-market product by multiplying said predicted market share and said present monetary value of said intended market, and displaying said monetary value of said pre-market product using said data processing system.

9. A method of determining the monetary value of an intangible property license between a licensor and a licensee using a data processing system, comprising the steps of:

using said data processing system to calculate an increase in a competitive advantage of said tangible asset as a percent variation due to said intangible asset subject to said license for said licensee;

using said data processing system to calculate a decrease in a competitive advantage of said tangible asset as a percent variation due to said intangible asset subject to said license for said licensor;

using said data processing system to determine a monetary value of said tangible asset by multiplying a monetary value for a market for said tangible asset and an average percent market share in said market;

using said data processing system to determine a minimum monetary value to said licensor by multiplying said percent decrease by said monetary value of said tangible asset;

using said data processing system to determine a maximum monetary value to said licensee by multiplying said percent increase by said monetary value of said tangible asset;

using said data processing system to calculate a net monetary value by subtracting a minimum monetary value to said licensor from a maximum monetary value to said licensee;

using said data processing system to determine an equal return payment that provides an equal return on investment to the licensor and licensee; calculating said monetary value to the licensor as equal to said equal return payment; and using said data processing system to calculate said monetary value to the licensee by subtracting said equal return payment from said net value.

10. A method of determining the monetary value of a new intangible asset using a data processing system, comprising the steps of:

identifying at least one parameter associated with said tangible asset relevant to commercial success in the marketplace;

inputting indicia relating to said parameter into said data processing system;

using said data processing system to compare said parameter with at least one parameter of at least one competing tangible asset to determine said competitive advantage said tangible asset as a percent variation;

using said data processing system to calculate a first competitive advantage for said tangible asset without said new intangible asset as a percent variation;

using said data processing system to calculate a second competitive advantage for said tangible asset with said new intangible asset as a percent variation;

using said data processing system to subtract said first competitive advantage for said tangible asset without said new intangible asset from said second competitive advantage for said tangible asset with said new intangible asset;

using said data processing system to calculate a present monetary value of an intended market for said tangible asset;

using said data processing system to calculate an average market share in said intended market as a percent;

using said data processing system to determine an average product present monetary value by multiplying said present monetary value of said intended market by said average market share; and using said data processing system to multiply said average product present monetary value and said change in said competitive advantage to determine the monetary value of said new intangible asset, and displaying said value of said new intangible asset using said data processing system.

11. A method of valuing an intangible asset, comprising the steps of:
- calculating a monetary value of a tangible asset associated with said intangible asset;
- determining a competitive advantage of said tangible asset over competing tangible assets as a percentage thereof;
- identifying a parameter dependent on said intangible asset and associated with said tangible asset that is relevant to commercial success in a marketplace;
- calculating said relative contribution of said intangible asset to said competitive advantage of said tangible asset based on a contribution of said parameter to said competitive advantage of said tangible asset as compared to related intangible assets; and
- multiplying said relative contribution of said intangible asset with said value of said tangible asset to determine a value for said intangible asset based upon a relative contribution of said intangible asset to said competitive advantage of said tangible asset, and
- outputting said value of said intangible asset.

12. A method of valuing a pre-market product, comprising the steps of:
- determining a present monetary value of an intended market for said pre-market product;
- comparing a plurality of parameters of said pre-market product to a plurality of corresponding parameters of competing products in said intended market to determine a competitive advantage for each said parameter of said pre-market product as a percent variation; and
- weighing and averaging said competitive advantages of the parameters to determine a competitive advantage of said pre-market product in said market;
- predicting a market share of said pre-market product based on said competitive advantage; and
- calculating a monetary value for said pre-market product by multiplying said predicted market share and said present monetary value of said intended market, and
- outputting said value of said pre-market product.

13. A method of determining the monetary value of a new intangible asset, comprising:
- identifying at least one parameter associated with said tangible asset relevant to commercial success in the marketplace;
- comparing said parameter with at least one parameter of at least one competing tangible asset to determine said competitive advantage said tangible asset as a percent variation;
- calculating a competitive advantage for said tangible asset without said new intangible asset as a percent variation;
- calculating a competitive advantage for said tangible asset with said new intangible asset as a percent variation;
- subtracting said competitive advantage for said tangible asset without said new intangible asset from said competitive advantage for said tangible asset with said new intangible asset to determine a change in a competitive advantage of a tangible asset associated with said new intangible asset as a percent variation; and
- calculating said monetary value by multiplying said change in said competitive advantage of said tangible asset and an average market share in an intended market, and
- outputting said value of said intangible asset.

* * * * *